United States Patent [19]

Williamson et al.

[11] 4,389,819
[45] Jun. 28, 1983

[54] GLASS POLISHING PROCESSES

[75] Inventors: John P. H. Williamson, Chester; John L. Moilliet, Abberley, both of England

[73] Assignee: Rhone-Poulenc Industries, Paris, France

[21] Appl. No.: 210,261

[22] Filed: Nov. 25, 1980

[30] Foreign Application Priority Data

Nov. 29, 1979 [GB] United Kingdom ............... 7941296

[51] Int. Cl.³ .............................................. B24B 1/00
[52] U.S. Cl. .................................. 51/317; 51/281 R; 51/284 R; 51/309
[58] Field of Search ............. 51/309, 281 R, 284 R, 51/317

[56] References Cited

U.S. PATENT DOCUMENTS

| 3,388,982 | 6/1968 | Foster | 51/309 |
| 3,458,300 | 7/1969 | Duvall | 51/309 |
| 3,685,218 | 8/1972 | Gambale et al. | 51/283 |
| 3,754,878 | 8/1973 | Burke | 51/309 |
| 4,161,394 | 7/1979 | Regan | 51/284 R |

FOREIGN PATENT DOCUMENTS

| 658913 | 3/1963 | Canada | 51/309 |
| 4321358 | 12/1964 | Japan | 51/309 |
| 53-3518 | 2/1978 | Japan | 51/309 |
| 1398765 | 6/1971 | United Kingdom . | |

OTHER PUBLICATIONS

The Condensed Chemical Dictionary, Reinhold Pub. Corp., 1961, New York, p. 666.

Primary Examiner—James H. Derrington
Attorney, Agent, or Firm—Burns, Doane, Swecker & Mathis

[57] ABSTRACT

A polishing process for mineral and organic ophthalmic lenses involves essentially a first step of mixing cerium oxide powder or zirconium oxide powder with (a) an alkali metal or ammonium salt of the condensation product of naphthalene sulphonic acid with formaldehyde, or of lignin sulphonic acid serving as an anionic deflocculating agent in an amount necessary to cause deflocculation, (b) an electrolyte containing a metal cation having a valency greater than 1, and (c) water, to form a slurry in which the powder is in a state of reversible flocculation. By this method the performance of the polishing powder in terms of numbers of acceptable lenses processed by each kilo of the powder is greatly improved.

11 Claims, 1 Drawing Figure

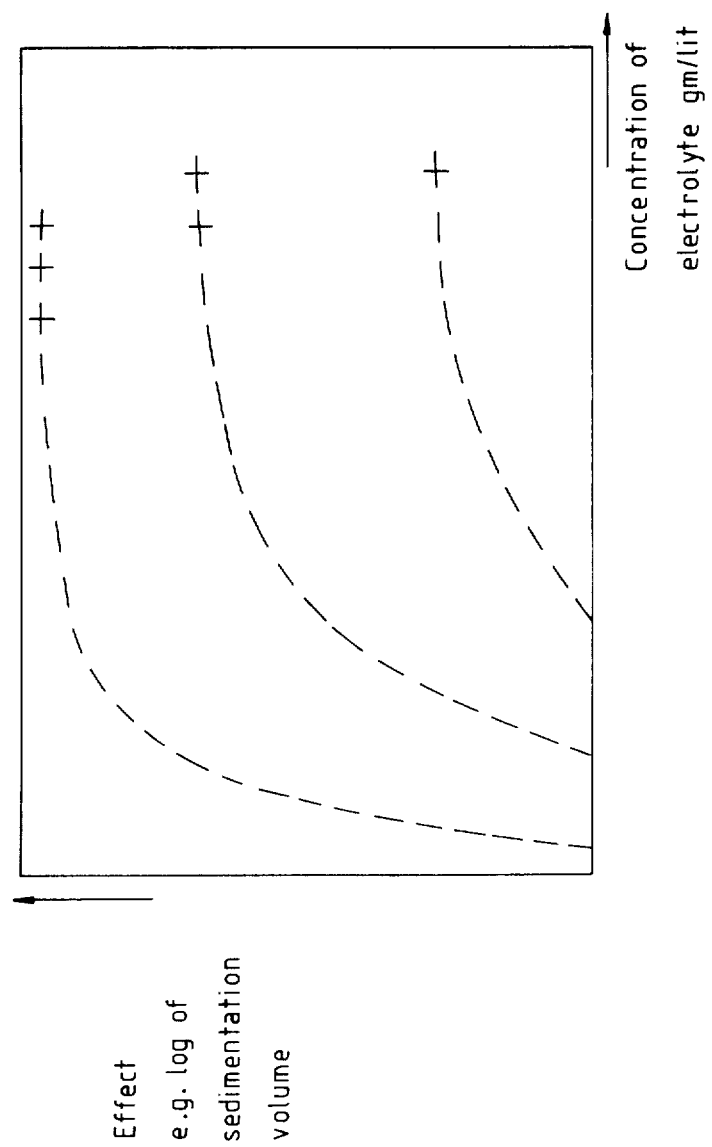

4,389,819

GLASS POLISHING PROCESSES

BACKGROUND TO THE INVENTION

This invention relates to a polishing process, more particularly but not solely to a polishing process suitable for polishing mineral and organic (plastics) opthalmic lenses.

The techniques of glass polishing have been extensively studied in recent years and much more technologically efficient materials are now available than the traditional jewellers' rouge still used twenty years ago. Most of the modern polishing processes are based upon the use of specially developed rare earth compounds or zirconium oxide. Cornish and Watt in "Mechanism of Glass Polishing", Paper at American Ceramic Society Symposium on the Surface Chemistry of Glass, May 9–11, 1966, have given descriptions of the polishing process in general. Silvernail and Silvernail in "The mechanics of glass polishing", Optical World, August 1980, in describing the current theories of the mechanism of the polishing action as the abrasion hypothesis, the flow hypothesis and the chemical-mechanical hypothesis, suggest that the latter has come to be accepted as the principal mechanism. They further define the "polishing activity" in terms of the rate of weight loss of the glass piece during polishing and have been able to make useful predictions of the practical aspects of the behaviour of a polishing powder from an experimental analysis of such data. Gambale and Stone in their U.S. Pat. No. 3,685,218, August 1972, have discussed the beneficial effect of certain additives to the powder and also made clear the necessity to produce a material which will polish glass and do so efficiently; whilst Khaladji in "A quantitative analysis of polishing efficiency obtained on standard machines" S.P.I.E. Vol 109, 1977, has discussed the relationships of powder composition to pad structure, and Transelco in their U.K. Pat. No. 1,398,765, June 1975, have stated "that it is possible to adjust the product (of their invention) to deliver a wide range of desirable properties". The matter of the present invention concerns the relationship of the polishing powder to the water.

OBJECT OF THE INVENTION

It is an object of the present invention to provide a means of improving the performance of a polishing powder in terms of the numbers of acceptable surfaces processed by each kilo of that powder.

SUMMARY OF THE INVENTION

According to the invention we provide a method of polishing mineral and organic material in which the polishing compound comprises a rare earth metal compound or zirconium oxide, in powder form mixed with water and maintained in a state of reversible flocculation.

The rare earth metal compound is especially an oxide e.g. cerium oxide.

Further, according to the invention we provide a polishing method in which the polishing compound comprises mixing the rare earth metal compound, or zirconium oxide, powder with (a) an alkali metal or ammonium salt of the condensation product of napthalene sulphonic acid with formaldehyde, or of lignin sulphonic acid serving as an anionic deflocculating agent in an amount necessary to cause deflocculation, (b) an electrolyte containing a metal cation having a valency greater than 1, and (c) water, to form a slurry in which the powder is in a state of reversible flocculation.

Further, according to the invention we provide a polishing method in which the polishing compound comprises mixing the rare earth metal compound, or zirconium oxide, powder with water, adding to the slurry so formed (a) an alkali metal or ammonium salt of the condensation product of napthalene sulphonic acid with formaldehyde or of lignin sulphonic acid serving as an anionic deflocculating agent in an amount necessary to cause deflocculation, and (b) an electrolyte containing a metal cation having a valency greater than 1, whereby said oxide powder is in a state of reversible flocculation.

The glass polishing compound may be prepared by mixing the anionic deflocculating agent in dry form with the powder. Then the electrolyte is added to the mixture of powder and deflocculating agent and further mixing effected. Alternatively, the anionic deflocculating agent, the powder, and the electrolyte can be mixed in a wet form.

The phenomenon we have used is known by some workers in the field of colloid science as "flocculation in a secondary free energy minimum" which is a state of highly reversible flocculation. We have shown that the polishing efficiency of a number of rouges can be improved, by inducing this state in a rouge, by the unexpectedly high factor of two or more.

Two steps are taken in the process of preparing the polishing compound although in practice they may sometimes be taken simultaneously:
 first: the anionic deflocculating agent is added in an amount necessary to cause deflocculation.
 second: the electrolyte is added in an amount which restores the final "settled volume" near to or preferably above the level which would have developed had no deflocculating agent been added.

Suitable anionic deflocculating agents are marketed under various trade names such as "Matexil DC-AC" and "Lissatan AC" (Registered Trade Marks).

It is generally accepted that the anionic deflocculating agent is adsorbed by the particle of rouge and that in the absence of the electrolyte deflocculation is due to the combined effects of a steric barrier layer and an electro-kinetic potential. When the multivalent electrolyte is present the electrokinetic potential is reduced to the extent that an appreciable degree of flocculation occurs, that is, many of the particles cling together because of their mutual "van der Waals" attraction. The steric barrier layer is not destroyed by the added electrolyte, it may even be strengthened. The result is that direct particle-to-particle adhesion is prevented so that the flocculated particles can be separated by agitation and by shearing at the polishing head and they can now function efficiently as individuals unimpeded by massively aggregated material, but under the relatively static condutions in the main slurry tank reflocculation occurs and "claying" is prevented.

The deflocculating agents have been described by Moilliet, Collie and Black in "Surface Activity" 2nd Edition, 1961, pp 377–378, pp 491–492. For practical reasons it is essential to ensure that the chosen deflocculating agent neither induces excessive foaming nor attacks the pad adhesive. Whilst very small amounts such as 0.1% Matexil "DC-AC" cause some perceptible deflocculation which is evidenced by a cloudiness of the suspension the effect is partial unless about 0.5% of the powder has been added.

The amount of deflocculating agent required may be found by experiment but depends largely on the density, surface area and particle size distribution of the chosen powder. For typical rare earth products which vary in specific gravity from 5.0 to 6.7 the average amount of the deflocculating agent needed will lie between 1.5 grams and 4 grams per kilo of the rare earth product. Higher amounts than this may be used and, typically, 10-15 grams per kilo are used for the common commercial purpose of assisting the initial suspension properties. However all such added deflocculating agents suffer from the disadvantage that the rouge ultimately will settle very hard in the slurry tanks and pipes and cause considerable difficulties in processing.

The effect of the deflocculating agent can be examined in vitro by taking 10 grams of the chosen powder in a 100 ml graduated cylinder, adding a proportion of the deflocculating agent, making up to 100 ml with water, shaking thoroughly, and observing the modes of behaviour. A powder without added deflocculating agent will usually settle with a "falling boundary"; a powder containing the appropriate minimum or more of deflocculant will become cloudy and settle with a "rising boundary", forming ultimately a very hard deposit. The readings taken at various time intervals illustrate the pattern of behaviour and the reading after 24 hours is usually taken as the "final settled volume" (or "sedimentation volume"). As a general rule the final settled volume decreases with the amount of deflocculating agent added eventually reaching a limiting value. In order to ensure that the rouge particles are adequately covered by adsorbed deflocculating agent, we prefer to work at or near this limiting value of the sedimentation volume.

The electrolyte used is one containing a cation with a valency greater than one such as calcium, magnesium, strontium, barium or aluminum, and an anion which may be monovalent (e.g. chloride, bromide, acetate, formate or nitrate) or multivalent (e.g. sulphate). The general effect on sedimentation volume of adding salts with uni-, di-, and trivalent cations is illustrated diagrammatically in the accompanying drawing.

The effect of the anions carried by the electrolyte is less noticeable than that induced by the cations but, in general, anions such as phosphate or hydroxide which are sparingly soluble can also be used, calcium hydroxide, for instance, has been found to be effective.

There may be cases where the anionic deflocculant used contains already a flocculant additive in its formulation. For instance the condensation product of sodium napthalene sulphonic acid with formaldehyde may contain sodium sulphate, up to 15-20% of sodium napthalene sulphonate as an impurity, or sodium chloride as a diluent and advantage may be taken of this fact.

The proportion of electrolyte normally found convenient is between 10 grams and 20 grams per kilo of rouge powder although up to 50 grams has been used. However, the proportion of deflocculating agent which has been added will have the dominating effect—the higher the amount of deflocculant the higher the amount of flocculating electrolyte which will be required.

In general the rouge powder suspension referred to in the invention is characterised by the facts that (a) in the absence of added electrolyte it contains sufficient deflocculating agent that at a concentration of (say) 100 grams of rouge per liter of water the sedimentation volume will lie between 40% and 70% of that shown by the same concentration of the same powder in water alone, and (b) in the presence of the above amount of deflocculating agent it also contains enough of a metal salt with a multivalent cation sufficient to restore the sedimentation volume to at least 80% of the original value in the absence of the anionic deflocculating agent. We usually work within the limits of 90% and 110% of the untreated settled volume.

Typical results of the system are given below.

1. On a high speed (modified) single spindle CMV machine with a charge of 1228 grams of proprietary rare earth powder product in a 40 liter tank processing 64 mm flint glass with spherical surfaces with a polishing time of 4 minutes, and to an accuracy of not more than 6 rings.

The modified rouge powder referred to below contained 0.5% of the deflocculating agent "Matexil DC-AC" and 1% of calcium chloride crystal.

|  | Unmodified | Modified |
| --- | --- | --- |
| Rouge concentration | 30 grams/liter | 30 grams/liter |
| Highest recorded stock removal | 0.0015"(thou) | 0.0017"(thou) |
| Highest recorded stock removal | 400(mgm) | 470(mgm) |
| Mean stock removal after 5 working days | 0.00058"(thou) 140(mgm) | 0.0015"(thou) 400(mgm) |
| Number of surfaces polished | 630 | 1402 |
| Number of surfaces passed as 'first quality' | 620 | 1387 |
| Number of working days before stock removal fell to unacceptable levels | 5 | 11 |

2. Using the same modified CMV machine as in (1) the following results were obtained, but in this experiment, time and concentration were altered. A charge of 1638 grams of a proprietary rare earth powder was made into a 40 liter tank processing 64 mm flint glass spherical lenses. Polishing times were reduced to 2 minutes, but levels of accuracy were the same at 6 light rings maximum. The modified rouge powder in this system contained 0-5% of "Matexil DC-AC" and 3% of magnesium sulphate crystals.

|  | Umodified | Modified |
| --- | --- | --- |
| Rouge concentration | 40 grams/liter | 40 grams/liter |
| Highest recorded stock removal | 0.0017(thou) | 0.0019(thou) |
| Highest recorded stock removal | 470(mgm) | 525(mgm) |
| Mean stock removal after 5 working days | 0.0008 | 0.00166 |
| Number of surfaces polished | 1040 | 2675 |
| Number of surfaces passed as "first quality" | 988 | 2543 |
| Number of working days before stock removal fell to unacceptable level | 7 | 15½ |

3. In a "mass production+ factory ophthalmic lenses are processed in a very wide variety of conditions, at spindle speeds between 300 and 1500 r.p.m., and polishing times between 60 seconds and 60 minutes, with surfaces which are required to be spherical, toric or bifocal, and with different glass types, crown, flint or other glass materials. The following results were recorded over a test period of several weeks (only a limited number of the total machines available were, in fact, run with the modified rouge during this trial period).

|  | Unmodified | Modified |
| --- | --- | --- |
| Total consumption | 10,500 kg | 515 kg |
| Number of lenses | 2,171,300 | 206,200 |
| Lenses per kilo | 210 | 400 |

The "modification" used in the example above consisted of the addition of 5 gm of the sodium salt of the condensation product of naphthalene sulphonic acid with formaldehyde (Matexil DC–AC) per kilo of the chosen rouge and 10 grams of calcium chloride flake per kilo of the rouge.

The practical advantages of such a system when related to a powder not so modified may be said to be:
(i) improved rouge performance in terms of "first quality" lenses produced per unit weight of rouge consumed
(ii) better rouge suspension, particularly in large recirculating systems
(iii) longer slurry life
(iv) lower running costs overall
(v) easier production control
(vi) consistent performance throughout the slurry life.

We claim:

1. A method of polishing mineral and organic material in which the polishing compound comprises a material selected from the group consisting of rare earth metal compounds and zirconium oxide, which material is in powder form mixed with water and is maintained in a state of reversible flocculation by means of mixing the material with (a) an alkali metal or an ammonium salt of the condensation product of naphthalene sulfonic acid with formaldehyde or lignin sulfonic acid serving as an anionic deflocculating agent in an amount necessary to cause deflocculation, and (b) an electrolyte containing a metal cation having a valency greater than 1.

2. A method according to claim 1, wherein said electrolyte is selected from the group consisting of a chloride, bromide, acetate, formate, nitrate and sulphate of an element of the group consisting of calcium, magnesium, strontium, barium and aluminium.

3. A method according to claim 1, wherein the electrolyte is calcium chloride.

4. A method according to claim 1, wherein the quantity of deflocculating agent is from 1.5 to 15 grams per kilo of the powder.

5. A method according to claim 1, wherein the quantity of electrolyte is from 10 to 50 grams per kilo of the powder.

6. A method according to claim 1, wherein the powder comprises a rare earth oxide.

7. A method according to claim 5, wherein the powder comprises cerium oxide.

8. The method in accordance with claim 1, wherein an alkali metal or an ammonium salt of the condensation product of naphthalene sulfonic acid with formaldehyde serves as the anionic deflocculating agent.

9. The method in accordance with claim 1, wherein lignin sulfonic acid serves as the anionic deflocculating agent.

10. The method according to claim 1, wherein the polishing compound comprises that obtained by mixing the material in powder form with water, and then adding to the slurry so formed (a) an alkali metal or an ammonium salt of the condensation product of naphthalene sulfonic acid with formaldehyde serving as the anionic deflocculating agent, and (b) the electrolyte containing a metal cation having a valency greater than 1.

11. The method according to claim 1, wherein the polishing compound comprises that obtained by mixing the material in powder form with water, and then adding to the slurry so formed (a) lignin sulfonic acid serving as the anionic deflocculating agent, and (b) the electrolyte containing a metal cation having a valency greater than 1.

* * * * *